United States Patent
Wang et al.

(10) Patent No.: US 9,946,321 B2
(45) Date of Patent: Apr. 17, 2018

(54) SYSTEM AND METHOD TO PROACTIVELY SCREEN COMPONENT WEAR THROUGH TIME DOMAIN RESPONSE PROFILING

(71) Applicant: Dell Products, LP, Round Rock, TX (US)

(72) Inventors: Minchuan Wang, Austin, TX (US); Stuart Allen Berke, Austin, TX (US); Bhyrav M. Mutnury, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 199 days.

(21) Appl. No.: 14/880,761

(22) Filed: Oct. 12, 2015

(65) Prior Publication Data

US 2017/0102756 A1 Apr. 13, 2017

(51) Int. Cl.
*G06F 13/12* (2006.01)
*G06F 1/32* (2006.01)
*G06F 11/30* (2006.01)
*G06F 13/42* (2006.01)

(52) U.S. Cl.
CPC ........ *G06F 1/3206* (2013.01); *G06F 11/3048* (2013.01); *G06F 11/3051* (2013.01); *G06F 13/4282* (2013.01)

(58) Field of Classification Search
CPC ... H04L 5/0007; H04L 5/0048; H04L 5/0053; H04L 5/0044; H04L 5/0051
USPC ........................................................ 710/106
See application file for complete search history.

(56) References Cited

U.S. PATENT DOCUMENTS

| | | | |
|---|---|---|---|
| 6,473,467 B1 * | 10/2002 | Wallace | H04B 7/0417 370/208 |
| 6,628,725 B1 | 9/2003 | Adam et al. | |
| 7,340,698 B1 * | 3/2008 | Srinivasan | G01R 31/318357 703/13 |
| 8,243,782 B2 | 8/2012 | Mobin et al. | |
| 8,837,065 B1 * | 9/2014 | Mircea | G11B 20/10305 360/31 |
| 2002/0054578 A1 * | 5/2002 | Zhang | H04L 1/0001 370/328 |
| 2003/0130811 A1 * | 7/2003 | Boerhout | G05B 23/0235 702/56 |
| 2008/0304559 A1 | 12/2008 | Wu et al. | |
| 2009/0144584 A1 * | 6/2009 | Rowles | G06F 11/0793 714/25 |
| 2017/0070250 A1 * | 3/2017 | Kundmann | H04B 1/1027 |

FOREIGN PATENT DOCUMENTS

EP 1 643 678 A1 5/2006

* cited by examiner

*Primary Examiner* — Titus Wong
(74) *Attorney, Agent, or Firm* — Larson Newman, LLP

(57) ABSTRACT

A receiver of a serial communication channel including a memory to store an initial channel characteristic of the serial communication channel, a detector to measure a current channel characteristic of the serial communication channel, and a processor to compare the initial channel characteristic to the current channel characteristic, and to provide an indication when the difference between the initial channel characteristic to the current channel characteristic is greater than a threshold.

20 Claims, 5 Drawing Sheets

SYSTEM AND METHOD TO PROACTIVELY SCREEN COMPONENT WEAR THROUGH TIME DOMAIN RESPONSE PROFILING

FIELD OF THE DISCLOSURE

This disclosure generally relates to information handling systems, and more particularly relates to proactively screening component wear through time domain response profiling of high-speed serial links.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

As the speed of high speed serial interfaces increases, variations in circuit design, component manufacture, environmental conditions, and other factors make it increasingly difficult to ensure highly reliable data transmission. In particular, transmitter and receiver equalization mechanisms to compensate for channel loss are calibrated on a best-effort basis, where settings that result in a "good enough" compensation solution are quickly obtained, in favor of iterative processes that might yield a more optimal solution, but which require an inordinate amount of time for such link training. However, as speed increases, such best-effort processes are increasingly unable to produce settings that are indeed good enough due to the increased sensitivity to variation and degradation of the channel characteristics.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
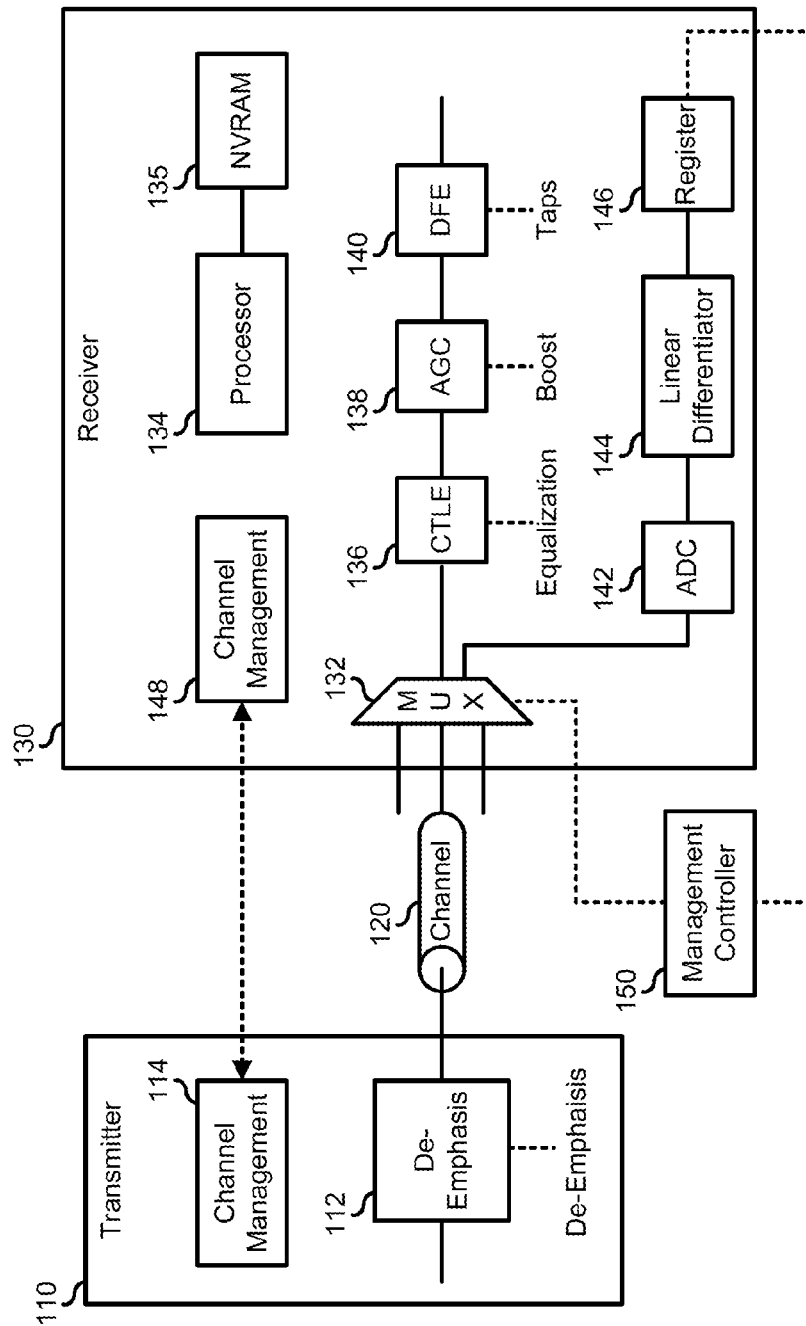
FIG. 1 illustrates an information handling system with a high speed serial interface according to an embodiment of the present disclosure.

FIG. 1 illustrates an embodiment of a high speed serial channel 100 of an information handling system. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Serial channel 100 includes a transmitter 110, a transmission channel 120, and receiver 130, and a management controller interface 150. Serial channel 100 represents one half of a pair of uni-directional serial data link for communicating data from transmitter 110 located at a first component to receiver 130 located at a second component. The other half of the pair of serial data link is similar to serial channel 100, but with a receiver in the first component, and a transmitter in the second component, for communicating data back from the second component to the first component. Here, the components can be understood to include elements within an information handling system, such as components that are attached to one or more printed circuit board of the information handling system, where transmission channel 120 can represent one or more circuit traces on the printed circuit board, and can include one or more connectors. The components can also be understood to include devices of an information handling system, such as a hard drive, a storage array, and the like, that are separate from the printed circuit board of the information handling system, where transmission channel 120 can include one or more transmission cables. An example of serial channel 100 includes a PCI-Express (PCIe) channel that is in compliance with one or more PCIe specification, up to, and including the PCIe 4.0 Specification, a Serial ATA (SATA) channel that is in compliance with one or more SATA specification, up to, and including the SATA 3.2 Specification, a SAS channel that is in compliance with one or more SAS specification, up to and including the Serial Attached SCSI 4.0 Standard, or another high speed serial channel.

Serial channel 100 operates in a link characterization mode to direct transmitter 110 to provide a test pattern that represents a step function stimulus of transmission channel 120. Receiver 130 then operates to receive and record the test pattern, as modified by the action of the impedance characteristics of transmission channel 120, and to estimate the impedance characteristics of the transmission channel. In particular, receiver 130 measures and records a time domain representation of the test signal as received by the receiver. The time domain representation of the test signal is used to estimate a time domain pulse response of transmission channel 120. A Fast Fourier Transform (FFT) of the pulse response is performed to obtain a frequency domain representation of the pulse response ($S_{21}$). The frequency domain representation of the transmission channel impedance ($S_{11}$) is then estimated and an inverse FFT (IFFT) of the frequency domain representation of the transmission channel impedance is performed to obtain the time domain representation of the transmission channel impedance.

In this way, as opposed to design studies and circuit simulations, the actual transmission channel impedance is derived on the actual circuit board, using the actual transmitter and the actual receiver, thereby taking real-time, in-situ measurements that account for variations in the transmitter integrated circuit (IC), the receiver IC, the circuit board, any variations in connections, connectors, and cables, or other sources of circuit variation. Here, the variations due to manufacturing tolerances and vendor specific performance, can be quickly and easily accounted for, and problems can be isolated to circuit device performance, trace layout performance, connection, connector, and cable performance, and the like. Moreover, where multiple transmission channels are present on a system design, variations between the transmission channels can be easily characterized and analyzed, and problems identified in order to improve transmission channel performance, system yield, and the like.

In a particular embodiment, the test pattern provided by transmitter 110 consists of 500 zeros (0) followed by 1500 ones (1), thereby providing a step function input to transmission channel 120 and to receiver 130. In another embodiment, different numbers of zeros and ones are provided such that the output of transmitter 110 represents a step function input to transmission channel 120 and to receiver 130. In particular, the ratio of ones to zeros can be 3:1, or can be a different ratio. In another embodiment, the test pattern provided by transmitter 110 is repeatedly provided to receiver 130, such that the estimation of the transmission channel impedance is based upon a large number of iterations of the test pattern. For example, the test pattern can be provided 100 times, 1000 times, 5000 times, or another number of times as needed or desired.

As used herein, transmission channel 120 represents the entire path between the output of transmitter 110 and the input of receiver 130. As such, transmission channel 120 can be representative of a combination of individual transfer functions between the output of transmitter 110 and a connection of the transmitter, a transfer function of the connection between the transmitter and a circuit board of serial channel 100, a transfer function of a trace on the circuit board between the transmitter and receiver 130, a transfer function of the connection between the circuit board and the receiver, a transfer function between the connection of the receiver and the input of the receiver, and of any other transmission channel discontinuities, such as connectors, cables, circuit stubs, or other impedances of a transmission channel.

Transmitter 110 includes a de-emphasis module 112 and a channel management module 114. In operation, serial data is provided to de-emphasis module 112, and the de-emphasis module operates to provide a reduction in the signal levels of the serial data after a first data bit is transmitted, in order to de-emphasize the subsequent data bits and to transmit the de-emphasized serial data to receiver 130 via transmission channel 120. The amount of de-emphasis is determined based upon a de-emphasis setting. For example, transmitter 110 can support 21 settings which each prescribe a different amount of de-emphasis, from 0 dB to 10 dB, in 0.5 dB steps. Other numbers of settings and amounts of de-emphasis prescribe by the settings can be utilized, as needed or desired. Channel management module 114 will be described below.

Receiver 130 includes a multiplexor 132, a processor module 134, a continuous time linear equalization (CTLE) module 136, an automatic gain control (AGC) module 138, a decision feedback equalization (DFE) module 140, an analog-to-digital converter (ADC) module 142, a linear differentiator 144, a register 146, and a channel management module 148. In a normal operation mode, multiplexor 132 provides a received signal to CTLE module 136, AGC module 138, and DFE module 140, and to set various compensation values within receiver 130 to provide a compensated output signal.

In the link characterization mode, the test pattern is received by multiplexor 132, and the multiplexor provides the test signal to ADC module 142, linear differentiator 144, and register 146 to obtain the time domain step response of transmission channel 120. A digital representation of the time domain step response of transmission channel 120 is stored in register 146. In a particular embodiment, processor 134 operates to estimate the time domain pulse response of transmission channel 120, to perform the FFT of the pulse response to obtain the frequency domain representation of the pulse response and channel through loss, or insertion loss, ($S_{21}$), to estimate the transmission channel impedance, or return loss, ($S_{11}$), and to perform the IFFT of the frequency domain representation of the transmission channel impedance to obtain the time domain representation of the transmission channel impedance. Here the time domain representation of the transmission channel impedance is provided to management controller 150 for further analysis, as needed or desired.

In another embodiment, the digital representation of the time domain step response of transmission channel 120 is provided by register 146 to management controller 150, and another device of system receives the time domain representation of the transmission channel impedance. Here, the device estimates the time domain pulse response of transmission channel 120, performs the FFT of the pulse response to obtain the frequency domain representation of the pulse response ($S_{21}$), estimates the transmission channel impedance ($S_{11}$), and performs the IFFT of the frequency domain representation of the transmission channel impedance to obtain the time domain representation of the transmission channel impedance.

Figure 2:
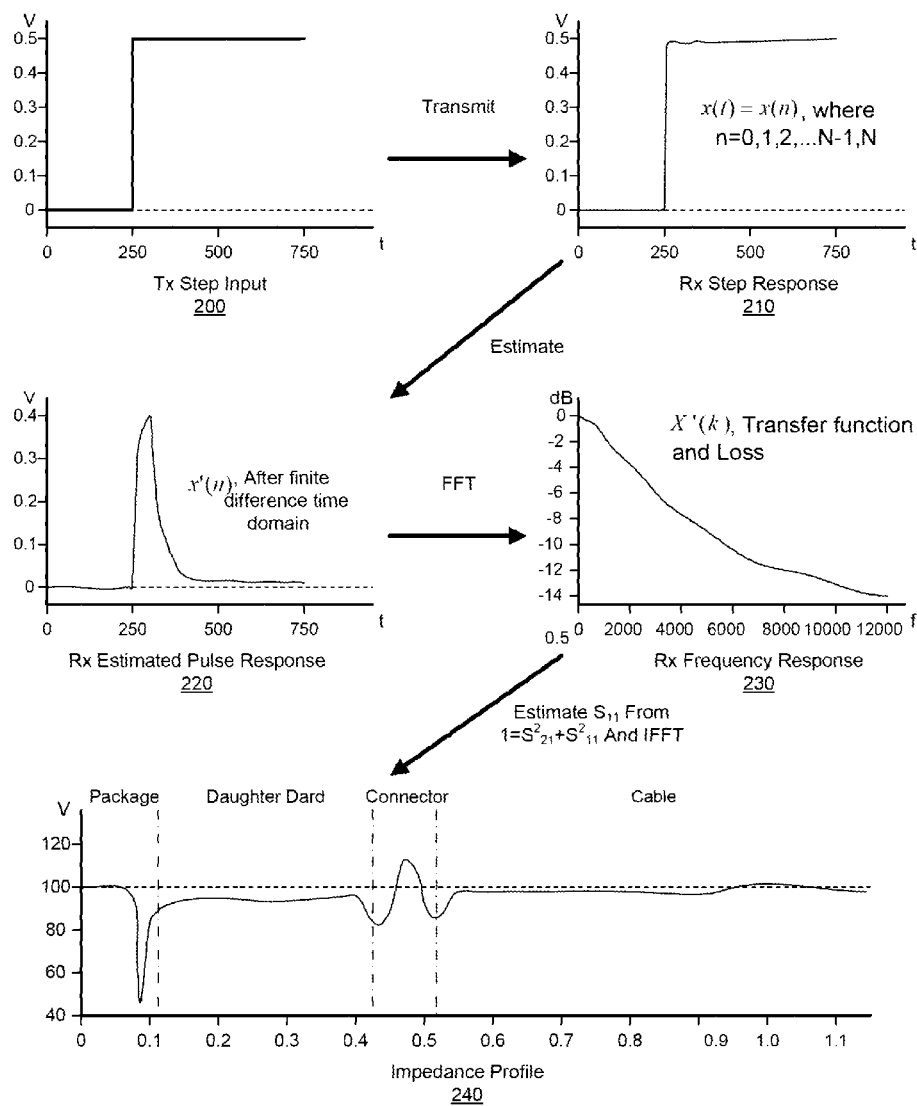
FIG. 2 illustrates a method of obtaining the time and frequency domain representations of the transmission channel impedance and channel loss based upon the transmission by a transmitter of a test pattern that provides a step function according to an embodiment of the present disclosure.

FIG. 2 illustrates a method of obtaining the time domain representation of the transmission channel impedance based upon the transmission by a transmitter of a test pattern that provides a step function, as shown in the graph 200. Here, 250 zeros (0) are followed by 500 ones (1). The test pattern is transmitted to a receiver and the receiver receives and records the test pattern, as modified by the action of the impedance characteristics of the transmission channel, as shown in graph 210. The receiver can capture a discrete time domain representation of the received test pattern, such that:

$$x(t) = x(n) \qquad \text{Equation 1}$$

where n=0, 1, 2, . . . N−1, N. The time domain pulse response is estimated from the discrete time domain step response by estimating the finite difference function, as shown in graph 220, such that:

$$x'(t) = \frac{x(n+1) - x(n)}{\Delta t}; x'(n) = x(n+1) - x(n) \qquad \text{Equation 2}$$

The FFT of the finite difference function is performed to obtain a frequency domain representation of the pulse response ($S_{21}$), as shown in graph 230, such that:

$$X(k) = \sum_{n=0}^{N-1} x(n) \cdot e^{-i\left(\frac{2\pi}{N}\right)kn} \qquad \text{Equation 3}$$

where k=0, 1, 2, . . . N−1, N. Note that the transfer function value at the frequency of interest is given as k/2π. As such, the transfer function of the return loss is estimated as:

$$y(k) = \sum_{n=0}^{N-1} \sqrt{1 - x(k)^2} \qquad \text{Equation 4}$$

The frequency domain representation of the transmission channel impedance ($S_{11}$) is then estimated using:

$$1 = S_{21}^2 + S_{11}^2 \qquad \text{Equation 5}$$

and the IFFT of the frequency domain representation of the transmission channel impedance is performed to obtain the time domain representation of the transmission channel impedance, as shown in graph 240, such that:

$$y(n) = \frac{1}{N} \sum_{n=0}^{N-1} y(k) \cdot e^{i\left(\frac{2\pi}{N}\right)kn} \qquad \text{Equation 6}$$

where n=0, 1, 2, . . . N−1, N.

It will be understood that, as a serial channel similar to serial channel 100 ages, the components that compose the serial channel, including, for example, the transmitter IC, the receiver IC, the circuit board, solder joints, connections, connectors, cables, AC coupling capacitors (i.e., DC blocking capacitors), or other components, may be subject to various performance degradations, wear, and, ultimately, failure. Here, such performance degradations, wear, and failure can result in degraded signal quality at the receiver. However, as described above, a serial channel similar to serial channel 100 performs real-time, in-situ measurement of the actual transmission channel impedance and loss, and therefore the serial channel can track the degradation of the signal quality at the receiver as the serial channel ages.

Returning to FIG. 1, in a particular embodiment, when an information handling system that includes a serial channel similar to serial channel 100 is booted, particularly during a manufacturing process, the return loss estimate at one or more frequency of interest, as given in Equation 4, above, and the minimum and maximum transmission channel impedances, as given in Equations 5 and 6, above, are obtained based upon one or more iterations of the test pattern. The resulting return loss estimate and minimum and maximum impedance values are then stored in a component of the receiver, such as a non-volatile memory (NVRAM) 135 associated with processor 134. These initial return loss estimate and minimum and maximum impedance values provide a baseline for the operating condition of the serial channel at the time the information handling system is manufactured.

Later, during normal operations of the information handling system, and particularly when the information handling system is booted, or the serial channel is trained, the current return loss estimates and the minimum and maximum transmission channel impedances are obtained based upon one or more iterations of the test pattern. The current return loss estimate and minimum and maximum impedance values are then compared with the initial return loss estimate and minimum and maximum impedance values stored in NVRAM 135, to determine if the current return loss estimate and minimum and maximum impedance values have changed. In a particular embodiment, the current return loss estimate and minimum and maximum impedance values can be obtained when the information handling system is rebooted or when the serial channel is retrained, as noted above. In another embodiment, the current return loss estimate and minimum and maximum impedance values can be obtained at predetermined intervals, such as once a day, once a month, or the like, as needed or desired.

Figure 3:
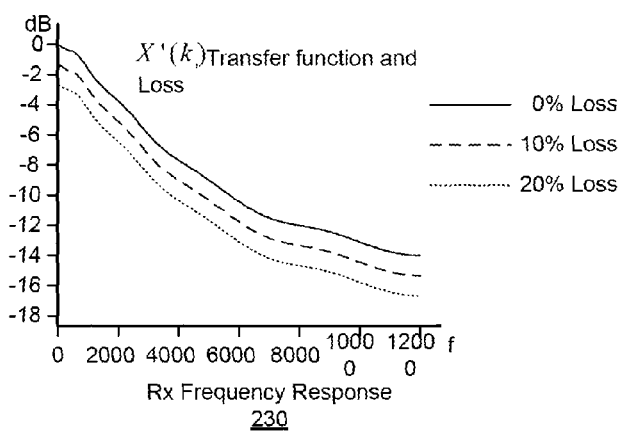
FIG. 3 illustrates a transfer function of insertion loss of a high speed serial interface according to an embodiment of the present disclosure.

FIG. 3 illustrates the through loss, or insertion loss ($S_{21}$) 230, as shown in FIG. 2, measured as an exemplary serial channel ages. The insertion loss can be used to determine if the channel impedance, or return loss ($S_{11}$) is becoming large compared to a threshold and flag that the one or more component of the channel is becoming degraded. The solid line shows the transfer function for an initial training of the serial link that is associated with a 0% insertion loss. The dashed line shows the transfer function for a later training of the serial link at a time when the signal degradation exhibits a 10% insertion loss. The dotted line shows the transfer function for an even later training of the serial at a time when the signal degradation exhibits a 20% insertion loss.

In a particular embodiment, a serial channel similar to serial channel 100 provides one or more insertion loss degradation threshold. Here, as the serial channel tracks the degradation of the insertion loss estimate and minimum and maximum loss values as the serial channel ages, a processor similar to processor 100 can compare the current insertion loss estimate and minimum and maximum loss values against the thresholds, and when the current insertion loss estimate and minimum and maximum loss values drop below the insertion loss degradation threshold level, the processor can provide an indication that the serial channel has degraded. In a particular embodiment, the serial channel includes a single insertion loss degradation threshold level, such as a 10% level, a 20% level, or another level, as needed or desired, and the single insertion loss degradation threshold level applies to all operating frequencies of the serial channel. In another embodiment, the serial channel includes multiple insertion loss degradation threshold levels, each being associated with a different operating frequency of the serial channel.

Figure 4:
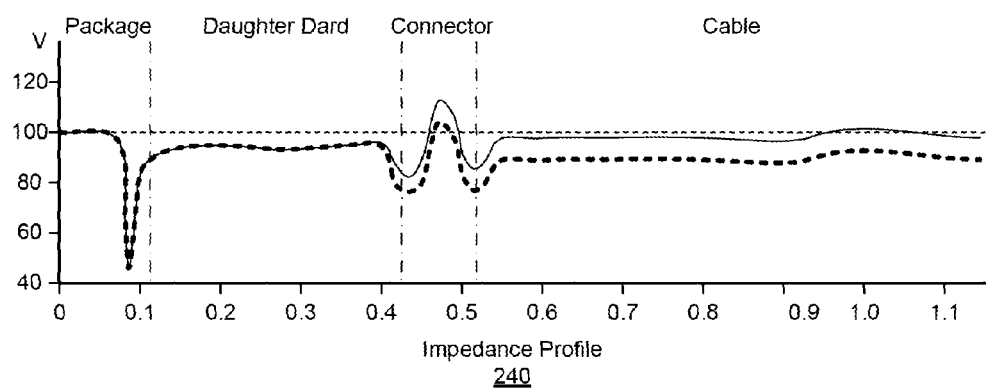
FIG. 4 illustrates a time domain representation of a transmission channel impedance of a high speed serial interface according to an embodiment of the present disclosure.

In a particular embodiment, when the current insertion loss estimate and minimum and maximum loss values drop below a insertion loss degradation threshold level, the serial channel operates to generate a time domain representation of the transmission channel loss, as shown above in graph 240. Here, the time domain representation of the current transmission channel loss will show degraded performance on the channel that is associated with the component or device that is experiencing the degradation. For example, FIG. 4 illustrates the time domain representation of the current transmission channel loss of graph 240, where the degradation is shown at the transmitter side of a connector in the signal path of the serial channel, where the degradation is indicated by the reduction in the signal at the transmitter side of the connector. Such a time domain representation of the current transmission channel loss can similarly detect where other components of the serial channel are degrading, such as the transmitter IC, the receiver IC, the circuit board, solder joints, connections, connectors, cables, AC coupling capacitors, DC blocking capacitors, or other components, as indicated by the location where the time domain representation signal is degraded. In a particular embodiment, by identifying a component that has degraded performance, an indication is given that alerts a service technician to proactively repair or replace a particular component on the serial channel.

In a particular embodiment, rather than obtaining the initial insertion loss and the initial minimum and maximum transmission channel loss, one or more value can be stored based upon a model of the transmission channel, and the model values can be used in comparing against current insertion loss estimate and minimum and maximum loss values.

Figure 5:
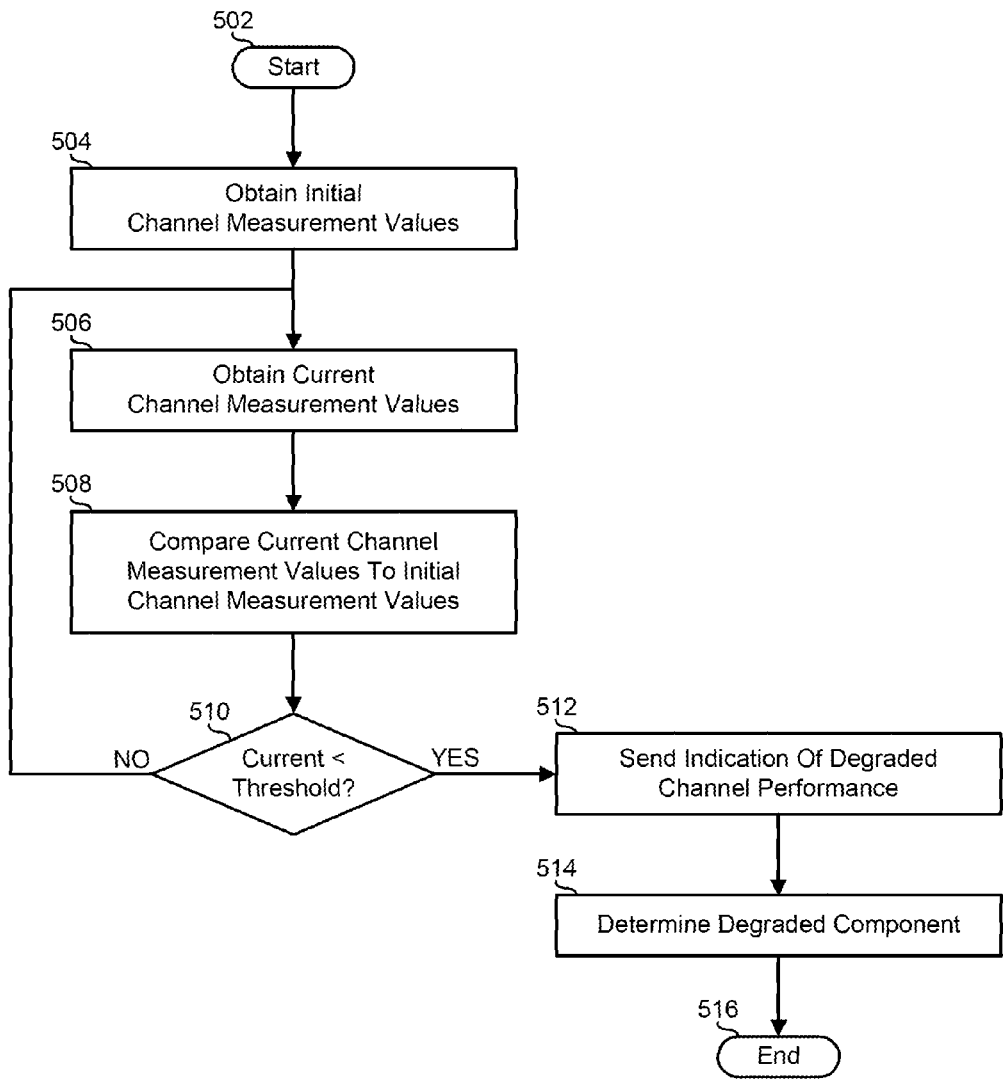
FIG. 5 is a flowchart illustrating a method to proactively screen component wear through time domain response profiling of high-speed serial links according to an embodiment of the present disclosure.

FIG. 5 illustrates a method to proactively screen component wear through time domain response profiling of high-speed serial links starting at block 502. The initial insertion loss estimate and minimum and maximum loss values are obtained for a serial channel in block 504. For example, the initial insertion loss estimate and minimum and maximum loss values for serial channel 100 can be obtained at the time that an information handling system that includes the serial channel is booted, such as during a manufacturing process. In another example, the initial insertion loss estimate and minimum and maximum loss values can be obtained based upon a model of the transmission channel. Current insertion loss estimate and minimum and maximum loss values are obtained in block 506. For example, serial channel 100 can obtain the current insertion loss estimate and minimum and maximum loss values when the information handling system is rebooted or when the serial channel is retrained, or the current insertion loss estimate and minimum and maximum loss values can be obtained at predetermined intervals, such as once a day, once a month, or the like, as needed or desired.

The current insertion loss estimate and minimum and maximum loss values are compared to the initial insertion loss estimate and minimum and maximum loss values in block 508, and a decision is made as to whether or not the current insertion loss estimate and minimum and maximum loss values are below a threshold value in decision block 510. If not, the "NO" branch of decision block 510 is taken and the method insertions to block 506 where the current insertion loss estimate and minimum and maximum loss values are obtained. If the current insertion loss estimate and minimum and maximum loss values are below the threshold value, the "YES" branch of decision block 510 is taken and an indication of degraded channel performance is sent in block 512. The degraded component is determined in block 514, and the method ends in block 516. For example, the time domain representation of the current transmission channel loss can be generated and the failing component identified.

Figure 6:
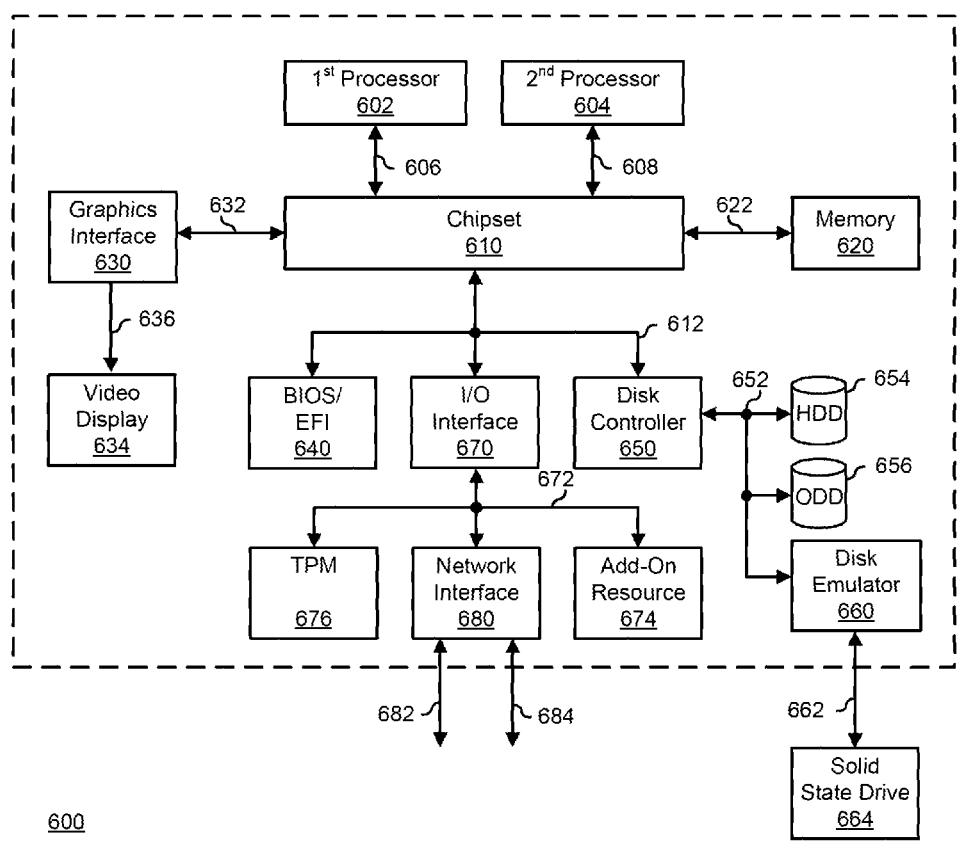
FIG. 6 is a block diagram illustrating a generalized information handling system according to an embodiment of the present disclosure.

FIG. 6 illustrates a generalized embodiment of information handling system 600. For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described above, and operates to perform one or more of the methods described above. Information handling system 600 includes a processors 602 and 604, a chipset 610, a memory 620, a graphics interface 630, include a basic input and output system/extensible firmware interface (BIOS/EFI) module 640, a disk controller 650, a disk emulator 660, an input/output (I/O) interface 670, and a network interface 680. Processor 602 is connected to chipset 610 via processor interface 606, and processor 604 is connected to the chipset via processor interface 608. Memory 620 is connected to chipset 610 via a memory bus 622. Graphics interface 630 is connected to chipset 610 via a graphics interface 632, and provides a video display output 636 to a video display 634. In a particular embodiment, information handling system 600 includes separate memories that are dedicated to each of processors 602 and 604 via separate memory interfaces. An example of memory 620 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 640, disk controller 650, and I/O interface 670 are connected to chipset 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 640 includes BIOS/EFI code operable to detect resources within information handling system 600, to provide drivers for the resources, initialize the resources, and access the resources. BIOS/EFI module 640 includes code that operates to detect resources within information handling system 600, to provide drivers for the resources, to initialize the resources, and to access the resources.

Disk controller 650 includes a disk interface 652 that connects the disc controller to a hard disk drive (HDD) 654, to an optical disk drive (ODD) 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits a solid-state drive 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O interface 670 includes a peripheral interface 672 that connects the I/O interface to an add-on resource 674, to a TPM 676, and to network interface 680. Peripheral interface 672 can be the same type of interface as I/O channel 612, or can be a different type of interface. As such, I/O interface 670 extends the capacity of I/O channel 612 when peripheral interface 672 and the I/O channel are of the same type, and the I/O interface translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as chipset 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A receiver of a serial communication channel, comprising:
   a memory to store an initial channel characteristic of the serial communication channel;
   a detector to measure a time domain response of the serial communication channel to a training sequence as received by the receiver; and
   a processor to:
      generate a current channel characteristic of the serial communication channel based on the response;
      compare the initial channel characteristic to the current channel characteristic; and
      provide an indication when the difference between the initial channel characteristic and the current channel characteristic is greater than a threshold.

2. The receiver of claim 1, wherein:
   the training sequence comprises a step-function signal transmitted on the serial communication channel; and
   in generating the current characteristic, the processor is further to estimate a first pulse response based upon the time domain response.

3. The receiver of claim 2, wherein, in generating the current channel characteristic, the processor is further to generate a frequency domain representation of the first pulse response.

4. The receiver of claim 2, wherein in estimating the first pulse response, the processor is further to estimate a finite difference function for the first response, where:
   the first response is given as a discreet function $x(t)=x(n)$, where $n=0, 1 \ldots N-1, N$; and
   the finite difference function is given as $x'(t)=(x(n-1)-x(n))/\Delta t$.

5. The receiver of claim 3, wherein, in generating the current channel characteristic, the processor is further to estimate a frequency domain representation of a transfer function of a return loss of the serial communication channel based upon frequency domain representation of the first pulse response, the transfer function being estimated at a characteristic frequency of the serial communication channel.

6. The receiver of claim 3, wherein, in generating the frequency domain representation of the first pulse response, the processor is further to perform a Fast Fourier Transform of the first pulse response.

7. The receiver of claim 3, wherein:
   the initial channel characteristic represents a frequency domain representation of a second pulse response of the serial communication channel as received by the receiver; and
   in comparing the initial channel characteristic to the current channel characteristic, the processor is further to compare the frequency domain representation of the second pulse response to the frequency domain representation of the first pulse response.

8. The receiver of claim 5, wherein, in generating the current channel characteristic, the processor is further to:
   estimate a frequency domain representation of a channel impedance for the serial communication channel based upon the estimate of the transfer function of the return loss; and
   generate a time domain representation of a current channel impedance based upon frequency domain representation of the channel impedance.

9. The receiver of claim 8, wherein:
   the initial channel characteristic represents a time domain representation of an initial channel impedance of the serial communication channel; and
   in comparing the initial channel characteristic to the current channel characteristic, the processor is further to compare the time domain representation of the initial channel impedance to the time domain representation of the current channel impedance.

10. The receiver of claim 9, the processor further to determine a degraded component of the serial communication channel based upon the comparison of the initial channel characteristic with the current channel characteristic.

11. The method of claim 1, wherein:
    the training sequence comprises a step-function signal transmitted on the serial communication channel; and
    in generating the current characteristic, the method further comprises estimating, by the processor, a first pulse response based upon the time domain response.

12. The method of claim 11, wherein, in generating the current channel characteristic, the method further comprises:
    generating, by the processor, a frequency domain representation of the first pulse response.

13. The method of claim 11, wherein in estimating the first pulse response, the method further comprises estimating, by the processor, a finite difference function for the first response, where:
    the first response is given as a discreet function $x(t)=x(n)$, where $n=0, 1 \ldots N-1, N$; and
    the finite difference function is given as $x'(t)=(x(n-1)-x(n))/\Delta t$.

14. The method of claim 12, wherein, in generating the current channel characteristic, the method further comprises:
    estimating, by the processor, a frequency domain representation of a transfer function of a return loss of the serial communication channel based upon frequency domain representation of the first pulse response, the transfer function being estimated at a characteristic frequency of the serial communication channel.

15. The method of claim 12, wherein:
    the initial channel characteristic represents a frequency domain representation of a second pulse response of the serial communication channel as received by the receiver; and
    in comparing the initial channel characteristic to the current channel characteristic, the method further comprises comparing, by the processor, the frequency domain representation of the second pulse response to the frequency domain representation of the first pulse response.

16. The method of claim 14, wherein, in generating the current channel characteristic, the method further comprises:
    estimating, by the processor, a frequency domain representation of a channel impedance for the serial communication channel based upon the estimate of the transfer function of the return loss; and
    generating, by the processor, a time domain representation of a current channel impedance based upon frequency domain representation of the channel impedance.

17. The method of claim 16, wherein:
    the initial channel characteristic represents a time domain representation of an initial channel impedance of the serial communication channel; and
    in comparing the initial channel characteristic to the current channel characteristic, the method further comprises comparing, by the processor, the time domain representation of the initial channel impedance to the time domain representation of the current channel impedance.

18. The method of claim 17, further comprising:
determining, by the processor, a degraded component of the serial communication channel based upon the comparison of the initial channel characteristic with the current channel characteristic.

19. A method, comprising:
storing, at a memory of a receiver of a serial communication channel, an initial channel characteristic of the serial communication channel;
measuring a time domain response of the serial communication channel to a training sequence as received by the receiver;
generating, by a processor of the receiver, a current channel characteristic of the serial communication channel based on the time domain response;
comparing, by the processor, the initial channel characteristic to the current channel characteristic; and
providing an indication when the difference between the initial channel characteristic and the current channel characteristic is greater than a threshold.

20. A non-transitory computer-readable medium including code for performing a method, the method comprising:
storing an initial channel characteristic of a serial communication channel;
measuring a time domain response of the serial communication channel to a training sequence as received b the receiver;
generating a current channel characteristic of the serial communication channel based on the time domain response;
comparing the initial channel characteristic to the current channel characteristic; and
providing an indication when the difference between the initial channel characteristic and the current channel characteristic is greater than a threshold.

* * * * *